United States Patent [19]

Wakefield

[11] Patent Number: 5,012,920
[45] Date of Patent: May 7, 1991

[54] ROLLER CONVEYOR SYSTEMS

[75] Inventor: Brian N. Wakefield, Leamington Spa, England

[73] Assignee: The Reiss Engineering Co. Ltd., Stanmore, England

[21] Appl. No.: 446,871

[22] Filed: Dec. 6, 1989

[30] Foreign Application Priority Data

Dec. 7, 1988 [GB] United Kingdom ............ 8828605

[51] Int. Cl.$^5$ .............................................. B65G 13/06
[52] U.S. Cl. ......................................................... 198/781
[58] Field of Search .......................................... 198/781

[56] References Cited

U.S. PATENT DOCUMENTS

| 4,286,441 | 9/1981 | Scheneman | 198/781 |
| 4,343,396 | 8/1982 | George | 198/781 |
| 4,706,801 | 11/1987 | Vessey | 198/781 |
| 4,733,772 | 3/1988 | Potter | 198/781 |

FOREIGN PATENT DOCUMENTS

| 0149694 | 7/1985 | European Pat. Off. |
| 3222936 | 12/1983 | Fed. Rep. of Germany |
| 3720609 | 1/1989 | Fed. Rep. of Germany | 198/781 |
| 1250505 | 8/1986 | U.S.S.R. | 198/781 |
| 964311 | 7/1964 | United Kingdom | 198/781 |

Primary Examiner—Joseph E. Valenza
Attorney, Agent, or Firm—Watson, Cole, Grindle & Watson

[57] ABSTRACT

A drive sprocket is rotatably mounted on the end of a shaft of a roller and is engaged with a drive chain. Coupled with the drive sprocket, to rotate with it, is a first drive member, having a frusto-conical axially directed annular drive transmission surface. This surface is in contact with the corresponding surface of a second drive member, which is keyed to the shaft to rotate therewith, yet slidable axially on the shaft. A spring is provided to bias the drive transmission surfaces into contact to transmit drive from the chain and sprocket to the roller via the drive members. Adjustment of the spring bias and/or the cone angle of the surfaces allows for alteration of the level of resistance to rotation of the roller at which the surfaces will slip and cease to transmit drive to the roller.

10 Claims, 2 Drawing Sheets

ROLLER CONVEYOR SYSTEMS

This invention relates to improvements in driven roller conveyor systems in which the drive to a driven roller can be interrupted.

According to one aspect of the present invention there is provided a roller conveyor system comprising a plurality of transversely extending roller assemblies rotatably mounted in longitudinally extending frame members and drive means for rotating at least some of the roller assemblies, the drive means comprising, in respect of at least some of the driven roller assemblies, a rotatable drive member rotatable relative to the roller assembly about an axis, a first drive transmitting member associated with the drive member for rotation therewith and having a first annular drive transmitting surface centered on said axis, a second drive transmitting member co-axial with said first drive transmitting member for rotation with the roller assembly and having a second annular drive transmitting surface centered on said axis, the first and second drive transmitting surfaces being axially directed, opposed and maintained in contact for normally transmitting drive by frictional engagement between said surfaces from the drive member to the roller assembly, said drive transmitting surfaces being adapted to slip relative to each other when the resistance to rotation of the roller assembly exceeds a predetermined level.

The drive member and the first and second drive transmitting members are preferably co-axial with the respective driven roller assembly The first drive transmitting member may be formed on, or made separately and made angularly fast with, the drive member. Preferably, it is made separately and is keyed to the drive member and may be made of a material which will wear.

The first and second drive transmitting surfaces are preferably frusto-conical. The cone angles of the surfaces, which are substantially equal, may advantageously be in the range of 30°–60°.

A roller assembly preferably comprises a shaft rotatably mounted in at least one of the longitudinally extending frame members. The drive member and the first and second drive transmitting members are, in a preferred embodiment, mounted on a portion of the shaft extending outwardly from the frame member. The first and second drive transmitting members may advantageously be located between the outer end of the shaft portion and the drive member, to allow the drive transmitting members to be removed from the shaft, for repair or replacement, without the need to remove the drive member or to disturb the mounting of the shaft in the frame member The shaft may advantageously be an axial extension of the roller of the respective roller assembly.

The drive transmitting surfaces are advantageously axially biased together to maintain permanent contact therebetween, by biasing means which may be a spring, preferably a helical compression spring co-axial with the axis.

Retaining means may be provided for axially compressing the spring against the second drive transmitting member, which member is axially movable The axial position of the retaining means is preferably adjustable to allow for adjustment of the spring bias and hence the level of resistance to rotation of the roller assembly at which the drive transmitting surfaces will slip relative to each other.

The drive member preferably comprises a sprocket wheel which is engaged by a drive chain.

An embodiment of the invention will now be described, by way of example only, with reference to the accompanying drawings in which:

FIGS. 1 and 2 show an embodiment of a driven roller conveyor system comprising a plurality of transversely extending roller assemblies, of which two roller assemblies 1, 2, are shown, both of which are driven.

Figure 1:
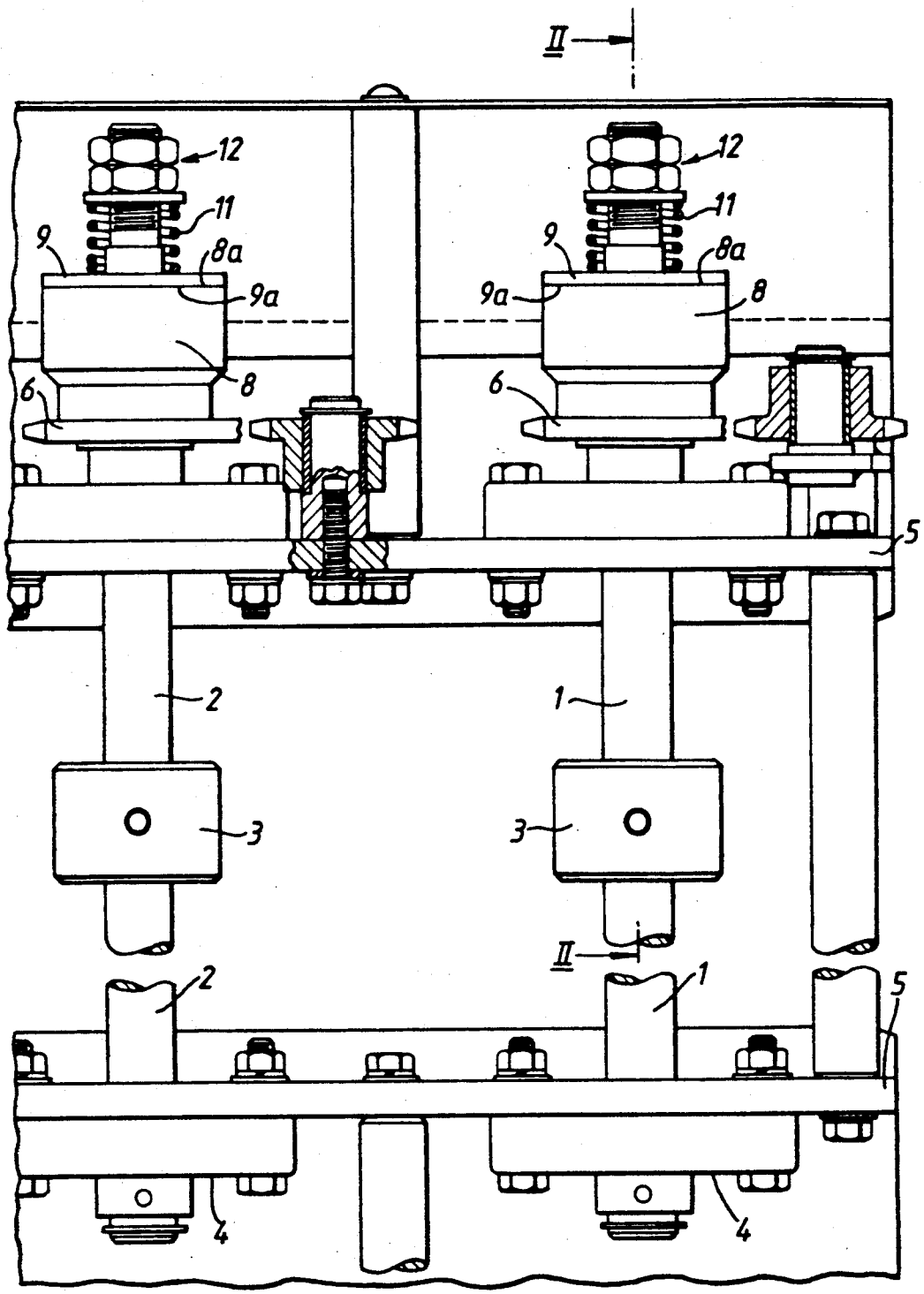
FIG. 1 is a partially cut away top plan view of an embodiment of a roller conveyor system in accordance with the present invention.
Figure 2:
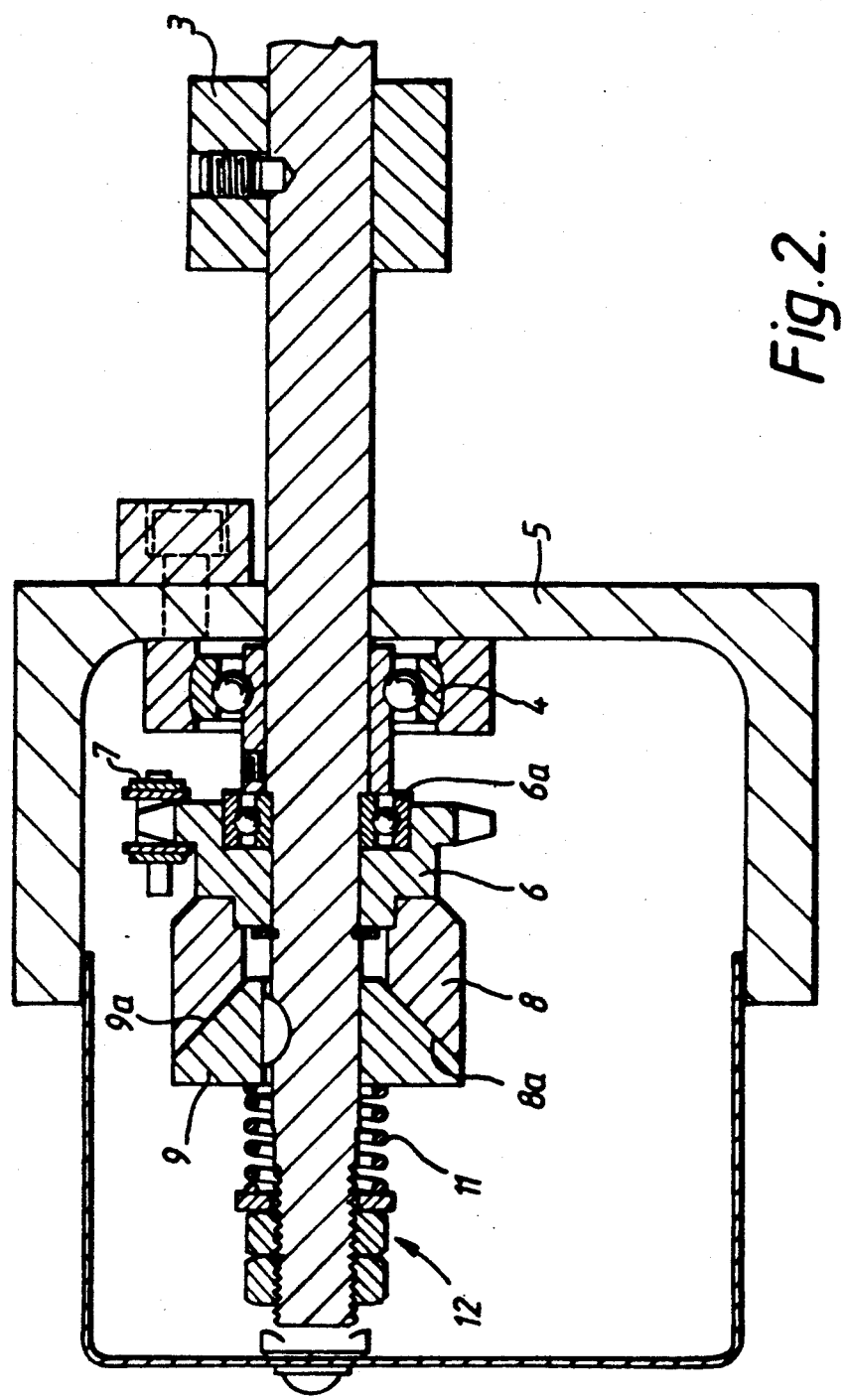
FIG. 2 is a cross-sectional view along the line II—II of FIG. 1.

Each roller assembly 1, 2, has a conveying portion on which articles are in use supported and by which they are conveyed. As shown, each roller assembly 1, 2, comprises a central shaft or roller provided with wheel-like portions 3 for engaging the articles.

At each end, each roller assembly 1, 2, is mounted in a rotary self aligning bearing 4 in a longitudinally extending frame member 5. At one end, the shaft of each roller assembly extends axially beyond bearing 4 and on this extended portion carries a rotatable drive member 6, as shown in the form of a toothed sprocket wheel which is engaged and rotated by a drive chain 7. Drive member 6 is mounted on the roller assembly on a bearing, eg. rotary ball bearing 6a, to rotate relative to the roller assembly about the axis thereof. The drive member 6 is associated with an annular drive transmitting member 8 which is rotatable therewith and has an axially outwardly directed frusto-conical drive transmitting surface 8a. For reasons which will appear, the drive transmitting member 8 is axially and rotatably engaged with the drive member 6, the drive transmitting member 8 having axially extending lugs which engage in recesses in the adjacent end face of the drive member 6.

Drive transmitting surface 8a faces a corresponding axially directed frusto-conical drive transmitting surface 9a on a drive transmitting member 9 mounted on the shaft of the roller assembly for rotation therewith. As shown, drive transmitting member 9 is keyed to the roller assembly by engagement of a key in a groove in the shaft of the roller assembly, so as to be axially slidable relative thereto.

One of the drive transmitting members 8, 9, is made from a material which will wear, for example nylon, and the other from a harder wear resistant material. Preferably, the second drive transmitting member 9 is made of the wear resistant material.

The drive transmitting surfaces 8a, 9a are maintained in contact by biasing means 11 which may, as shown, be in the form of a helical compression spring provided on and co-axial with the shaft of the roller assembly. The spring 11 is retained on the shaft of the roller assembly by retaining means 12, as shown in the form of a washer and two lock nuts, threaded onto the threaded end of the shaft of the roller assembly.

In use, the friction between the contacting drive transmitting surfaces 8a, 9a, is such that the surfaces rotate together in a non-slip condition to transmit drive from member 6 to the roller assembly. However, the drive transmitting surfaces 8a, 9a, will slip relative to each other when the resistance to rotation of the roller assembly exceeds a certain level. In this slip condition the drive member 6 continues to be driven by drive chain 7 and to rotate on the shaft of the roller assembly, with drive transmitting surface 8a slipping over stationary drive transmitting surface 9a.

The compression of the spring 11 may be adjusted, for example to accommodate wear to the drive transmitting surfaces 8a, 9a, by adjusting the retaining means 12. The level of resistance to rotation of the roller assembly at which the drive transmitting surfaces 8a, 9a, will transfer from a condition of non-slip to a condition of slip can also be altered by adjusting the position of the retaining means 12. A further advantage of this arrangement is that by removing the retaining means 12, the spring 11 and drive transmitting members 8, 9 may be readily slid off the end of the shaft of the roller assembly without the need to remove the drive member 6 or the drive chain 7 or to dismount the shaft from the frame member 5. This is particularly useful where, because of wear to the drive transmitting surfaces 8a, 9a, it is necessary to replace one of the drive transmitting members 8, 9.

As mentioned above, by increasing the preload of the spring 11, it is possible to increase the level of torque on the roller of the roller assembly (ie. the resistance to rotation) which is required to cause the surfaces 8a, 9a, to transfer from a condition of non-slip to a condition of slip. This may also be varied by varying the cone angle of the frusto-conical drive transmitting surfaces 8a, 9a. Preferably, the cone angle is in the range of 30°-60° although it may be greater than 60° or less than 30°.

Although the drive transmitting surfaces 8a, 9a are shown as both being continuous annular surfaces, one of the surfaces may be dis-continuous and may, for example, comprise a plurality of surface portions which cooperate together to define an annular drive transmitting surface (not shown).

Although each roller assembly may comprise a single roller extending transversely between the two frame members, stub rollers may alternatively be provided, one extending from each longitudinally extending frame member 5.

Furthermore, although not illustrated, drive may be transmitted through one set of drive transmitting members 8, 9 to the rollers of more than one roller assembly, for example by providing at the opposite axial end of the roller of the driven assembly means for transmitting drive to an adjacent roller or rollers, for example using a chain and sprocket arrangement (not shown).

In an alternative to the illustrated embodiment, the drive transmitting members may be provided on a shaft mounted on the frame member 5 and extending outwardly therefrom but separate from the roller of the roller assembly, the drive transmitting member 9 being rotationally coupled with the rollers of one or-more roller assemblies, for example by a chain and sprocket arrangement (not shown).

I claim:

1. A roller conveyor system comprising a plurality of transversely extending roller assemblies rotatably mounted in longitudinally extending frame members and drive means for rotating at least some of the roller assemblies, said drive means comprising, in respect of at least one of said driven roller assemblies, a rotatable drive member mounted on an end portion of a shaft extending outwardly from a frame member, said rotatable drive member being rotatable relative to said roller assembly about an axis of said shaft end portion, a first drive transmitting member mounted on said drive member for rotation therewith and having a first annular drive transmitting surface centered on said axis and facing outwardly in the direction of the outer end of said shaft end portion, a second drive transmitting member mounted on said shaft end portion outwardly of and co-axially with said first drive transmitting member for rotation with said roller assembly and having a second annular drive transmitting surface centered on said axis facing inwardly towards said first annular drive transmitting surface, said first and second drive transmitting surfaces being frusto-conical with their cone angles substantially equal and being axially directed, opposed and maintained in contact to normally transmit drive by frictional engagement between said surfaces from said drive member to said roller assembly, and to slip relative to each other when the resistance to rotation of said roller assembly exceeds a predetermined level, said first and second drive transmitting members being dismountable from said drive member and shaft end portion, respectively, without the need to dismount said drive member from said shaft end portion.

2. A roller conveyor system as claimed in claim 1, wherein said first and second drive transmitting members and the rotatable drive member are co-axial with the respective driven roller assembly.

3. A roller conveyor system as claimed in claim 1, wherein biasing means are provided for axially biasing together said drive transmitting surfaces to maintain contact therebetween.

4. A roller conveyor system as claim in claim 3, wherein means are provided for adjusting the bias of said biasing means, to adjust the level of resistance to rotation of said roller assembly at which said drive transmitting surfaces will slip relative to each other.

5. A roller conveyor system as claimed in claim 3, wherein said second drive transmitting member is axially movable and retaining means are provided for axially compressing said biasing means against said second drive transmitting member, the axial position of said retaining means being adjustable to allow for adjustment of said bias.

6. A roller conveyor system as claimed in claim 1, wherein at least one of said driven roller assemblies comprises a shaft, and said first and second drive transmitting members and said drive member are mounted on said shaft.

7. A roller conveyor system as claimed in claim 6, wherein said shaft is mounted in at least one of said frame members and said drive transmitting members and said drive member are mounted on a portion of said shaft extending outwardly from a frame member.

8. A roller conveyor system as claimed in claim 7, wherein said first and second drive transmitting members are located between the outer end of said shaft portion and said drive member.

9. A roller conveyor system as claimed in claim 6, wherein said shaft is an axial extension of the roller of said roller assembly.

10. A roller conveyor system as claimed in claim 1, wherein said drive member comprises a sprocket wheel which is engaged by a drive chain.

* * * * *